United States Patent [19]

Nishimura

[11] Patent Number: 5,273,379

[45] Date of Patent: Dec. 28, 1993

[54] BLANK MATERIAL FOR DRILL AND DRILL THEREFROM

[75] Inventor: Takayuki Nishimura, Nara, Japan

[73] Assignee: GN Tool Co., Ltd., Nara, Japan

[21] Appl. No.: 890,954

[22] Filed: May 29, 1992

[30] Foreign Application Priority Data

Jan. 23, 1992 [JP] Japan .................................. 4-010041
Apr. 22, 1992 [JP] Japan .................................. 4-102789

[51] Int. Cl.$^5$ .............................................. B23B 51/02
[52] U.S. Cl. ................................ 408/144; 76/108.6; 408/145; 408/230
[58] Field of Search ............... 428/565, 551, 552; 408/144, 145, 230, 227; 76/101.1, 108.6, 108.1, DIG. 12, DIG. 11; 419/8, 13, 28, 38

[56] References Cited

U.S. PATENT DOCUMENTS

| | | | |
|---|---|---|---|
| 4,679,971 | 7/1987 | Maier | 408/145 |
| 4,762,445 | 8/1988 | Bunting | 408/144 |
| 4,880,707 | 11/1989 | Kohno et al. | 419/8 |
| 5,031,484 | 7/1991 | Packer | 407/119 |

FOREIGN PATENT DOCUMENTS

| | | | |
|---|---|---|---|
| 132652 | 2/1985 | European Pat. Off. | 408/145 |
| 5566 | 2/1980 | Japan | 408/145 |
| 134608 | 8/1984 | Japan | 408/144 |
| 10707 | 1/1991 | Japan | 408/144 |
| 277412 | 12/1991 | Japan | 408/144 |

Primary Examiner—Daniel W. Howell
Attorney, Agent, or Firm—Koda and Androlia

[57] ABSTRACT

A blank material for a drill having a cutting edge and a drill produced from this blank material. The blank material comprises a first blank material having a twisted groove formed on the outer circumference of a columnar base metal sinter and filled with a superhigh pressure sinter, the base metal sinter and the superhigh pressure sinter being sintered and affixed together into one body, and a second blank material composed of a base metal sinter, and the first and the second blank materials are sintered and affixed together at the end faces at superhigh pressure and high temperature. A drill is manufactured by fixing a shank material to the blank material, and forming a twisted cutting edge and a front edge part continuing therefrom, the cutting edge being formed on the superhigh pressure sinter on the first blank material and the front edge part being formed on the second blank material. A blank material with a first blank material and two second blank materials, the second blank materials being sintered and affixed respectively to each end face of the first blank material, is used, and split into two, and then two shank materials are fixed respectively to each of the two split shank materials, then two drills of high wear resistance and performance may be produced out of one blank material economically.

12 Claims, 11 Drawing Sheets

BLANK MATERIAL FOR DRILL AND DRILL THEREFROM

BACKGROUND OF THE INVENTION

1. Field of the Invention

The present invention relates to a blank material to be fabricated into a drill (a blank material for manufacturing a drill) possessing a twisted cutting edge, and a drill fabricated from this blank material.

2. Prior Art

Hitherto, in order to meet the demands for enhancement of cutting performance or extension of tool life, polycrystalline diamond sinter (PCD) or cubic boron nitride sinter (CBN) which is very high in hardness and excellent in wear resistance has been used in cutting parts.

As this kind of cutting tool, as shown in FIGS. 9 and 10 for example, there is a tool having a cutting element 80 formed of sinter shaped in a thin sheet chip and brazed 81 to the peripheral corner of a base metal 8. However, due to the small adhearing area of the cutting element 80 on the base metal 8, the adhesion strength by brazing is insufficient and heat is generated during cutting, and these cause the cutting element 80 to come off from the base metal 8 in a short period.

As a tool which has solved the above problem, a cutting tool produced from a blank material as shown in FIG. 12 or FIG. 13 has been known.

The former, shown in FIG. 12, comprises a superhigh pressure sinter 83 sintered and affixed only to the end portion of a cemented carbide base metal 82, and as shown in FIG. 11 a front end portion 84 is formed on the superhigh pressure sinter 83. In this tool the above problem has been solved. However, since a cutting part formed of superhigh pressure sinter 83 is provided only in the front end, the cutting performance is not particularly excellent.

The latter, shown in FIG. 13, comprises a twisted groove formed in a cemented carbide base metal 82 and filled with superhigh pressure sinter 83, the base metal 82 and the sinter 83 being sintered and affixed together into one body, and a twisted cutting edge is formed on the superhigh pressure sinter 83 under the process of manufacturing a drill. In order to fabricate this blank material into a drill, however, the end part of the blank material including the superhigh pressure sinter 83 must be cut off into the shape of a drill front end, process of which is very difficult. Furthermore this blank material can not be machined with the both ends supported and so it is very difficult to manufacture a drill of high precision.

To facilitate the machining of the end part of the latter blank material, it might be considered to extend the twisted groove only part of the way from one end toward the other end. But it would prove not easy if actually tried. That is, in this case the twisted groove is machined by using a disc-shaped grinding wheel of a certain diameter (for example, 150 mm), but the process by the grinding wheel makes the depth of the groove not constant in the end part (i.e. the groove becomes shallower as approaching the end), and as a result the thickness of the superhigh pressure sinter 83 becomes thin at the end side. Therefore, the area of this thin superhigh pressure sinter 83 can not have a cutting edge thereon, but only be part of the front end of a drill. Hence machining for forming the front end with this blank material proves difficult.

SUMMARY OF THE INVENTION

It is hence a primary object of the invention to provide a blank material for drill from which a drill of high precisition and of excellent wear resistance can be easily manufactured, and also to provide a high performance drill with excellent wear resistance.

To achieve the above object, the invention employs the following technical means.

(1) The blank material for drill of the invention comprises a first blank material having a twisted groove formed on the outer circumference of a columnar base metal sinter and filled with a superhigh pressure sinter, the base metal sinter and the superhigh pressure sinter being sintered and affixed together, and a second blank material composed of a base metal sinter, one end face of which is substantially the same shape as one end face of the first blank material, and these two end faces of the first and second blank materials are sintered and affixed together at superhigh pressure and high temperature.

(2) The drill of the present invention is produced by fixing a shank member to the blank material for drill described above (1), wherein a cutting edge and a front edge part continuing therefrom are formed on the blank material. Furthermore the cutting edge is formed on the superhigh pressure sinter of the first blank material and the front edge part is formed on the second blank material.

(3) The blank material for drill of the invention comprises a first blank material having a twisted groove formed on the outer circumference of a columnar base metal sinter and filled with a superhigh pressure sinter, the base metal sinter and the superhigh pressure sinter being sintered and affixed together, and two second blank materials composed of base metal sinter, one of the second blank materials having one end face which is substantially the same shape as one end face of the first blank material, while the other of the second blank materials having one end face which is substantially the same shape as the other end face of the first blank material. And the two second blank materials are respectively sintered and affixed together with the corresponding end faces of the first blank material at superhigh pressure and high temperature.

(4) And the drill of the invention is produced by splitting the blank material described above (3) into two and then fixing thus split blank material with a shank member, wherein a cutting edge and a front edge part continuing therefrom are formed on the split blank material. Furthermore the cutting edge is formed on the superhigh pressure sinter of the first blank material and the front edge part is formed on the second blank material.

(5) The second blank materials described above (1) and (3) may be preferably formed in a short columnar shape. The base metal sinter described above (1) and (3) may be of cemented carbide, and the superhigh pressure sinter may be of polycrystalline diamond or cubic boron nitride.

(6) In the drills described above (2) and (4), it is desired that the connecting part between the twisted cutting edge and the front edge part (generally referred to as an outer circumferential corner) be composed of a superhigh pressure sinter.

Being thus constituted, the present invention brings about the following actions and effects.

The drill of the invention includes a twisted cutting edge formed on a superhigh pressure sinter, in other words made of superhigh pressure sinter, which is sintered and affixed together with a base metal sinter at superhigh pressure and high temperature, so that the cutting edge will not come off due to the heat generated during cutting process and will not be worn easily. That is, such a drill obtains a very long tool life.

In particular, when an outer circumferential corner that is most important for drill performance is made of superhigh pressure sinter, the tool life becomes further extended.

Meanwhile, the drill fabricated from the blank material for drill of the invention performs with the above actions, and furthermore the first blank material is made of cemented carbide, it is easy to form a center for mounting on a machine in the first blank material. Therefore a drill of high performance may be manufactured economically.

In the blank material for drill formed by sintering and affixing two second blank materials to respective end faces of one first blank material, thus combined blank material may be split into two and each of the two may be fixed to two shank members respectively. That is, two drills of high performance may be produced from one blank material.

DETAILED DESCRIPTION OF THE INVENTION

Figure 1:
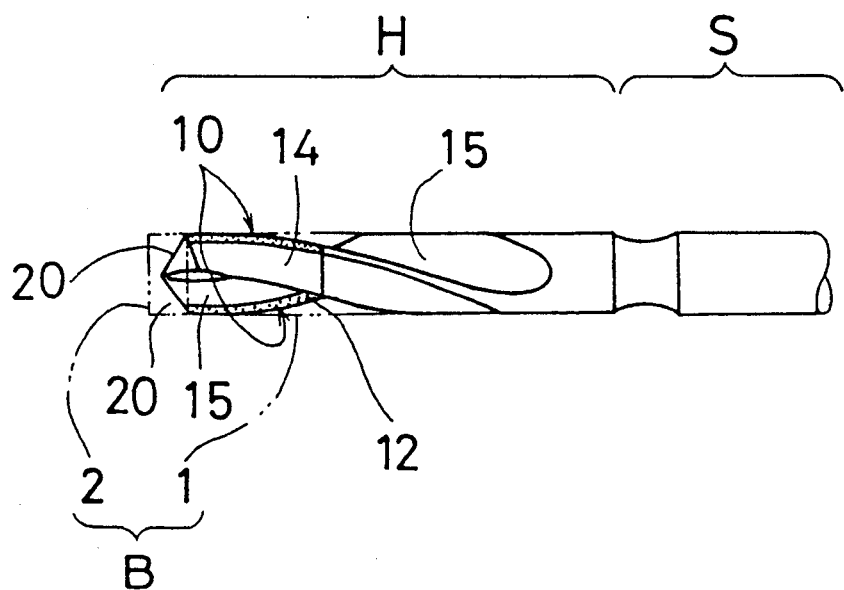
FIG. 1 is a side view of a drill of an embodiment of the invention.

Referring now to the drawings relating to embodiments, the constitution of the invention is described below.

The drill of an embodiment is, as shown in FIG. 1, composed of a cutting part H and a shank S bonded to one end thereof.

Figure 2:
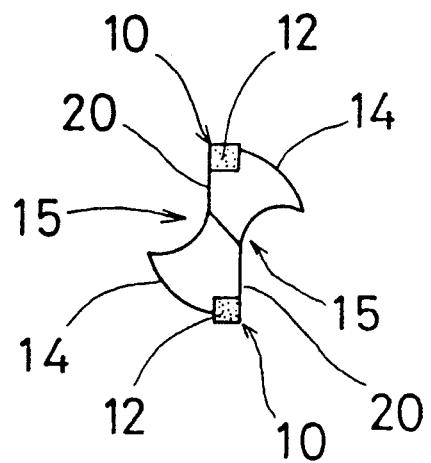
FIG. 2 is a detailed drawing of the front end part of the drill.

The cutting part H has two twisted flutes 15 and two lands 14 disposed alternately as shown in FIGS. 1 and 2, and possesses a spiral twisted cutting edge 10 formed at one side of each land 14 as shown in FIG. 1, and a straight front edge part 20 continuing from the front end of the twisted cutting edge 10. The base metal of the cutting part H is made of cemented carbide, and the portion of the twisted cutting edge 10 side (a specific area) on the land is made of sinter which is higher in hardness and wear resistance than cemented carbide (hereinafter referred to this sinter as superhigh pressure sinter 12). As such a superhigh pressure sinter 12, an arbitrary known material may be used as far as it is a sinter which is higher in hardness and wear resistance than cemented carbide, in particular it is preferable to use a sinter made by sintering powder of PCD or CNB at high temperature and superhigh pressure.

The shank S is made of cemented carbide, and as shown in FIG. 1, formed in a columnar shape of substantially the same diameter of the cutting part H. In the embodiment, the shank S is made of cemented carbide, but any other material with specific stiffness, such as steel, may be alternatively used.

In addition to the constitution of the drill in the embodiment described above, the blank material B forming the front portion (having a specific range) of the cutting part H includes a first blank material 1 and a second blank material 2. The manufacturing method of the blank material B is described below with referring to the drawings.

First Step

Figure 3:
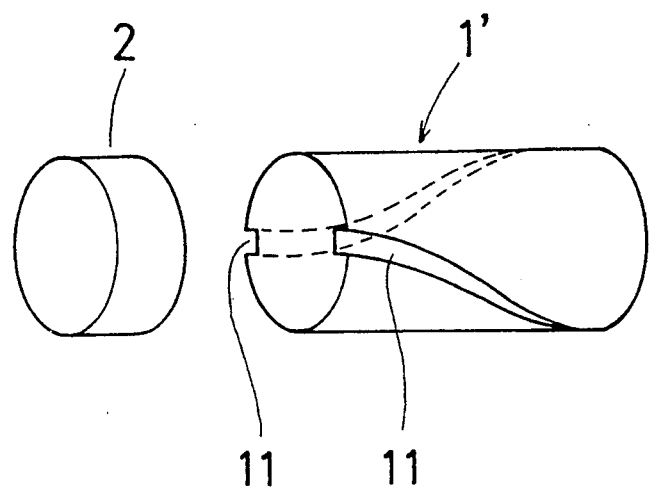
FIG. 3 is a drawing showing a base metal of a first blank material and that of a second blank material.

First, as shown in FIG. 3, two twisted grooves 11 are formed on the outer circumference of a base metal sinter of cemented carbide, thereby composing a blank material 1'. The twisted groove 11 is disposed at the position where the twisted cutting edge 10 of FIG. 1 is to be formed later.

A second blank material 2 is formed in a columnar shape having the same diameter as the first blank 1' and the length longer enough to make the front tip part of the drill.

Second Step

Figure 4:
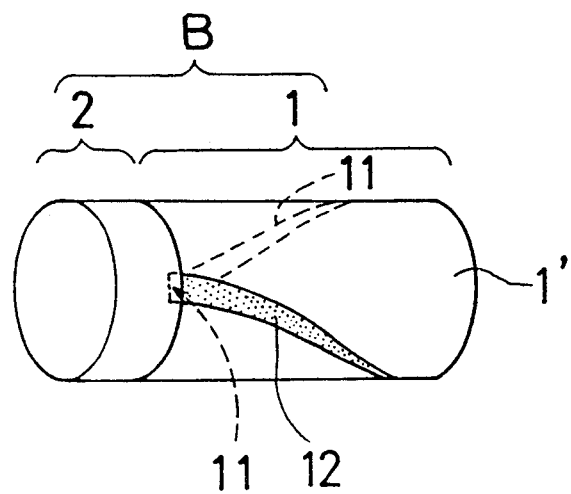
FIG. 4 is a diagram showing a state where the first blank material is attached to the second blank material.

As shown in FIG. 4, the blank material 1' and the second blank material 2 in FIG. 3 are brought to contact with each other (putting cobalt powder therebetween), and the twisted grooves 11 of the blank material 1' are filled with a mixture of material powder of superhigh pressure sinter 12 and proper sintering aid, or cementing agent, thereby forming the entire shape into a nearly columnar shape.

Third Step

Figure 5:
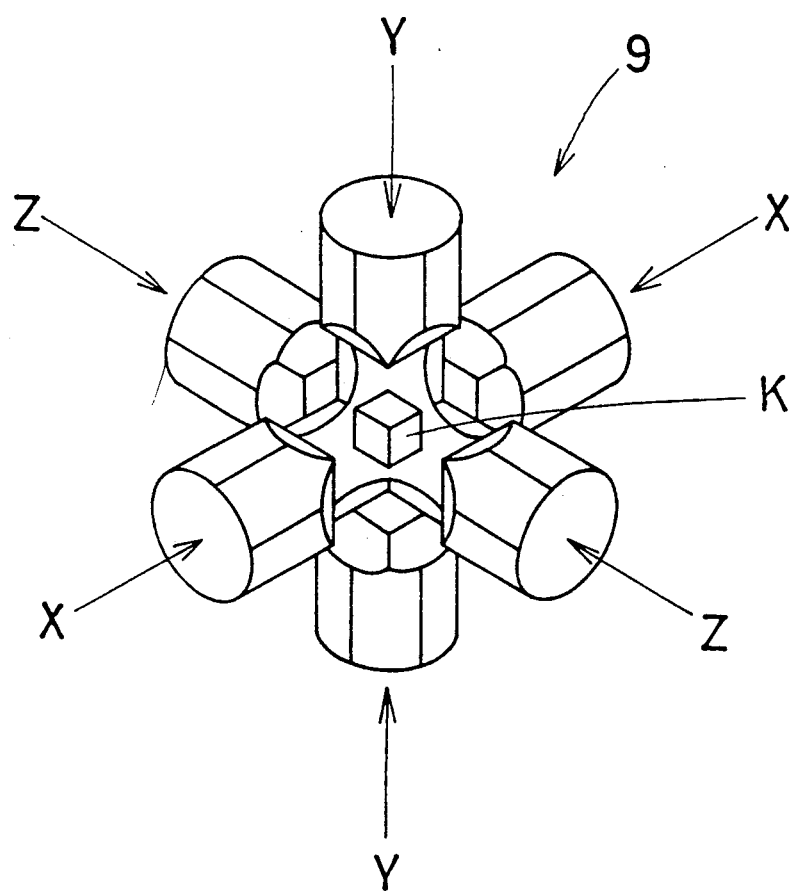
FIG. 5 is a conceptual diagram of a heating and presurizing apparatus used in manufacturing the drill.

In succession, what is manufactured in the second step is, being put in a capsule (container) K, placed in a heating and pressurizing device 9 as shown in FIG. 5, and kept in a condition of pressure of about 45,000 atmospheres or more and temperature of about 1,300° to 1,600° C. for three minutes or more. As a result, the first blank material 1' and the second blank material 2 are sintered and affixed together into one body, and the material powder filled in the twisted grooves 11 of the first blank material 1' is sintered itself, thereby forming a superhigh pressure sinter 12 within the twisted grooves 11.

Figure 6:
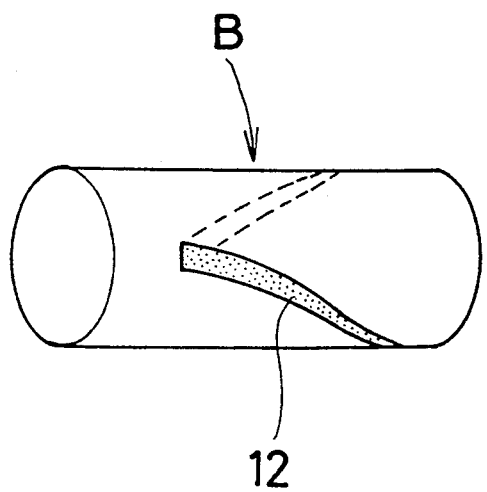
FIG. 6 is a drawing of a blank material for manufacturing a drill in an embodiment of the invention.

In this step, the first blank material 1', the second blank material 2 and the superhigh pressure sinter 12 are sintered and affixed all together into one body, then a blank material B of FIG. 6 has been completed.

The heating and pressurizing device 9 shown in FIG. 5 is designed to put pressure on three axial lines X, Y, Z (pressurize from six directions), and capable of manufacturing a sinter of solid structure.

The method of manufacturing a drill by using the blank material B produced in the first to third steps above is explained below.

First Step

Figure 7:
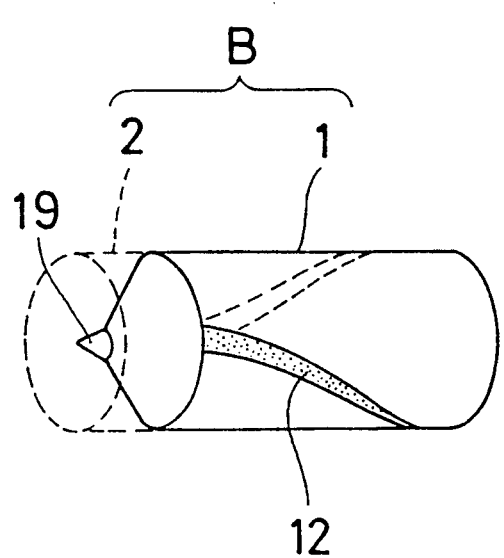
FIG. 7 is a drawing to show a center for mounting on a machine, which is formed by machining the blank material of FIG. 6.
Figure 8:
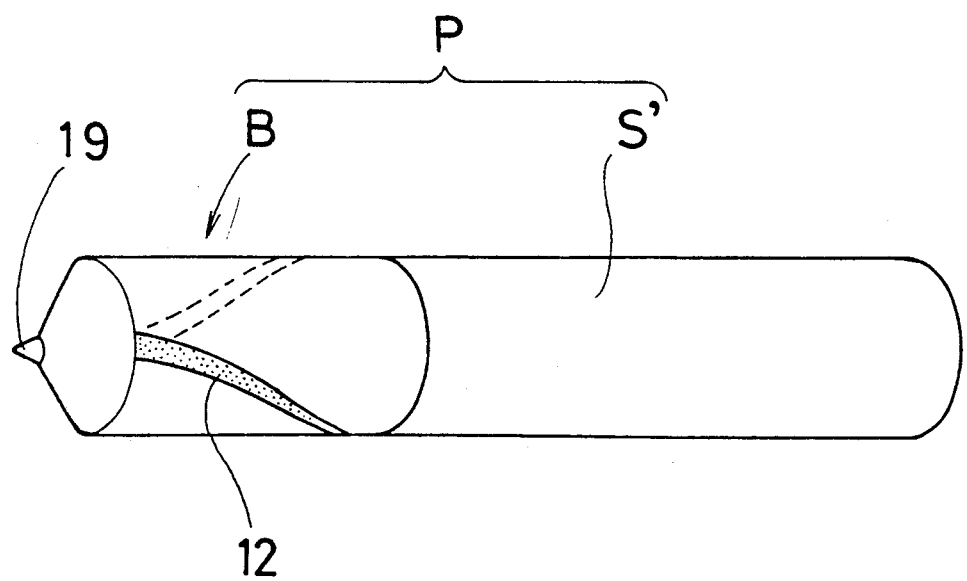
FIG. 8 is a drawing showing a state where the blank material of FIG. 7 is fixed to a shank member.
Figure 9:
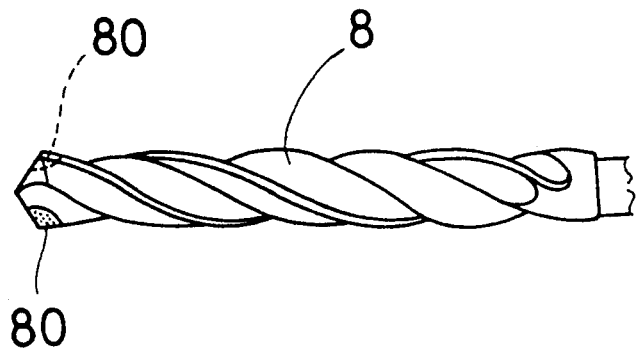
FIG. 9 is a side view of a drill of the prior art.
Figure 10:
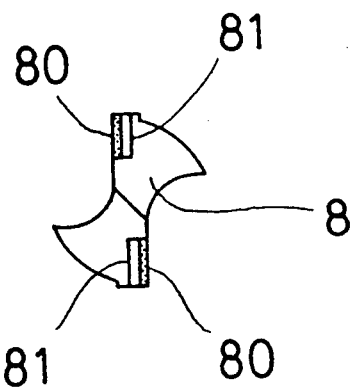
FIG. 10 is a detailed diagram of the front end part of the drill in FIG. 9.
Figure 11:
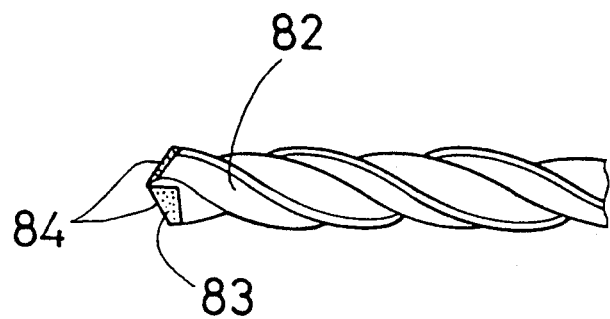
FIG. 11 is an explanatory diagram of essential part of the drill of the prior art.
Figure 12:
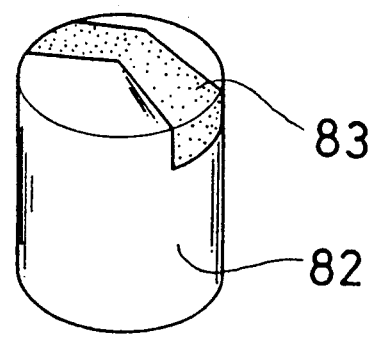
FIG. 12 is a drawing of a blank material for a front end portion of the drill in FIG. 11.
Figure 13:
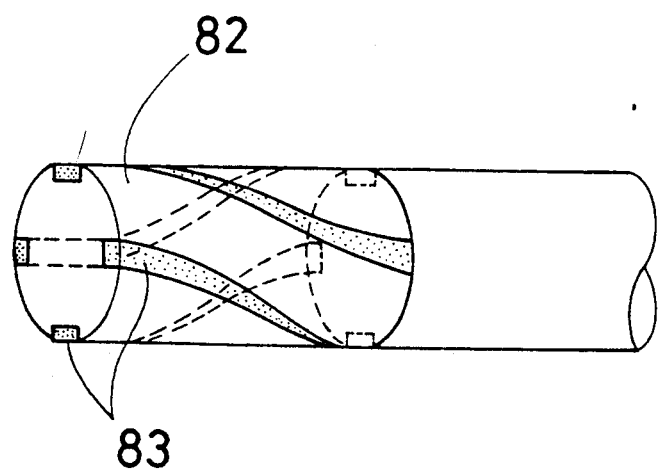
FIG. 13 is a drawing showing a state where a blank material for end mill of the prior art is fixed to a shank member.

The part of the second blank material 2 of the blank material B is ground and processed by a diamond grinding wheel up to the front end of the superhigh pressure sinter 12, a convex center 19 is formed as shown in FIG. 7. A shank material S' is brased to the other (back) end of the blank material B, thus a semifinished product P of a drill as shown in FIG. 8 is produced. In this embodiment, the center 19 is convex, but its shape may be different as required.

Second Step

Twisted flutes 15 and twisted lands 14 shown in FIGS. 1 and 2 are formed on the outer circumference of the first blank material 1 of the semifinished product.

The semifinished product is mounted on a tool grinding machine, and by a diamond grinding wheel two twisted grooves 15 and lands 14 are ground and machined on the outer circumference of the blank material B with leaving a finishing allowance on each superhigh pressure sinter 12.

Third Step

The precise and accurate finishing is conducted to the superhigh pressure sinter 12 by discharge cutting, electrolytic grinding or other method, to form a cutting edge 10 and a front edge part 20 on the blank material, and thus a drill shown in FIGS. 1 and 2 is completed. In this embodiment, the connecting part between the twisted cutting edge 10 and the front edge part 20 is machined to correspond to the front end of the superhigh pressure sinter.

Thus produced drill of the embodiment posses excellent wear resistance and high performance as described before.

Figure 14:
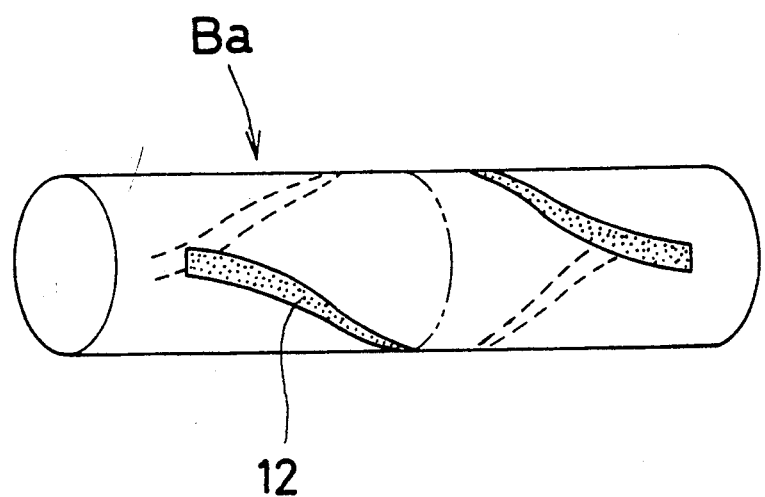
FIG. 14 is a drawing showing another blank material for drill in the invention.

Alternatively a blank material Ba shown in FIG. 14 may be employed, instead of the blank material B described above.

Figure 15:
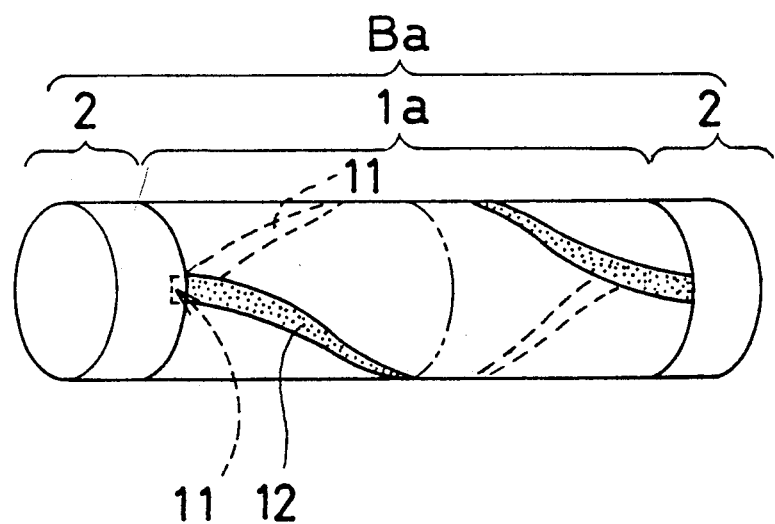
FIG. 15 is a diagram showing a state where a first blank material and two second blank materials are attached together.
Figure 16:
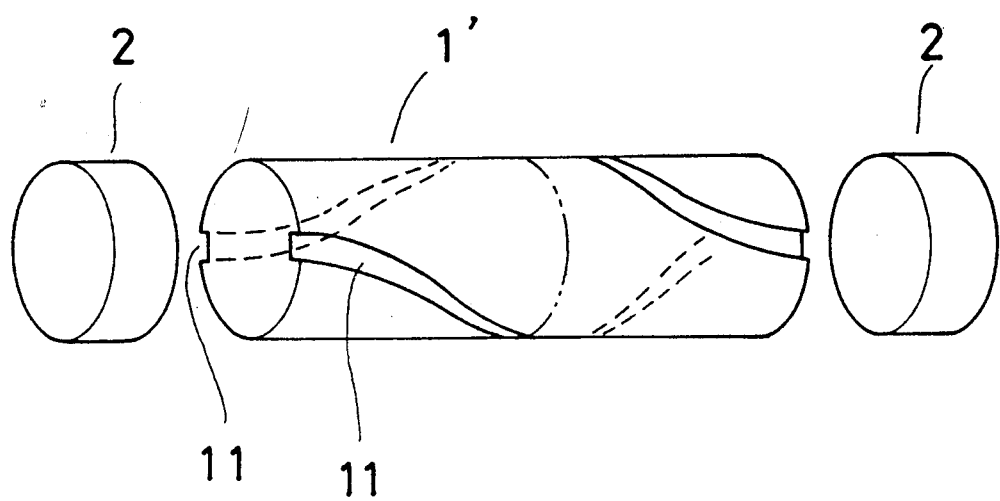
FIG. 16 is a drawing showing a base metal of a first blank material and base metals of second blank materials.

As shown in FIG. 15, the blank material Ba has a first blank material 1a twice as long as the first blank material of the above embodiment, and second blank materials are sintered and affixed to each end face of the first blank material 1a. The blank material Ba may be obtained by following the same steps of making a blank material set forth above, i.e. FIG. 16→FIG. 15→FIG. 14.

In order to fabricate a drill of FIGS. 1 and 2 from the blank material Ba, the blank material Ba is cut and split at the double dotted line in FIG. 14 and the same steps of fabricating a drill described above may be applied. In this embodiment, two drills of high efficiency may be produced from one blank material.

With using the blank material for drill in the present invention set forth above, a drill of high wear resistance and high performance may be obtained. Furthermore if a blank material with a first blank material and second blank materials, the second blank materials being sintered and affixed respectively to each end of the first blank material, is used, and split into two, and then a shank material is fixed respectively to each of the two, then two drills of high performance may be produced out of one blank material. Therefore, drills of high wear resistance and high performance may be economically produced.

What is claimed is:

1. A drill comprising:
   a first blank material having a twisted groove formed on the outer circumference of a columnar base metal sinter and filled with a superhigh pressure sinter, the base metal sinter and the superhigh pressure sinter being sintered and affixed together, and
   a second blank material composed of a base meta; sinter, on which is a front edge part,
   wherein one end face of the first blank material and that of the second blank material are sintered and affixed together at superhigh pressure and high temperature.

2. A blank material for drill according to claim 1, wherein the second blank material is formed in a short columnar shape.

3. A blank material for drill according to claim 1, wherein the base metal sinter is a cemented carbide.

4. A blank material for drill according to claim 1, wherein the superhigh pressure sinter is polycrystalline diamond or cubic boron nitride.

5. A blank material for a drill comprising;
   a first blank material having a twisted groove formed on the outer circumference of a columnar base metal sinter and filled with a superhigh pressure sinter, the base metal sinter and the superhigh pressure sinter being sintered and affixed together, and
   two second blank materials composed of base metal sinter, one end faces of the second blank materials being attached with respective end faces of the first blank material,
   wherein, the first and the second blank materials are sintered and affixed together at the end faces thereof at superhigh pressure and high temperature.

6. A blank material for drill according to claim 5, wherein the second blank materials are formed in a short columnar shape.

7. A blank material for drill according to claim 5, wherein the base metal sinter is a cemented carbide.

8. A blank material for drill according to claim 5, wherein the superhigh pressure sinter is polycrystalline diamond or cubic boron nitride.

9. A drill fabricated by:
   providing a first blank material having a twisted groove formed on the outer circumference of a columnar base metal sinter and filled with superhigh pressure sinter, the base metal sinter and the superhigh pressure sinter being sintered and affixed together,
   providing a second blank material composed of a base metal sinter, sintering together one end face of the first blank material and that of the second blank material at superhigh pressure and high temperature, fixing a shank material to the first blank material on the side opposite the second blank material, forming a twisted cutting edge on the superhigh pressure sinter of the first blank material and a front edge part on the second blank material continuing therefrom.

10. A drill according to claim 9, wherein the twisted cutting edge and the front edge part are connected at the front end part of the superhigh pressure sinter.

11. A drill fabricated by splitting a blank material into two, the blank material comprising a first blank material and two second blank materials according to claim 5, fixing a shank material to each of the split blank materials, forming a twisted cutting edge and a front edge part continuing therefrom on each of the split blank materials, wherein the cutting edge is formed on the superhigh pressure sinter of the first blank material and the front edge part is formed on the second blank material.

12. A drill according to claim 11, wherein the twisted cutting edge and the front edge part are connected at the front end part of the superhigh pressure sinter.

* * * * *